United States Patent [19]
Zhong et al.

[11] Patent Number: 5,650,245
[45] Date of Patent: Jul. 22, 1997

[54] LOW VISCOSITY ELECTROLYTE COMPRISING $P_2O_5$ FOR USE IN NON-AQUEOUS RECHARGEABLE LITHIUM BATTERIES

[75] Inventors: Qiming Zhong; Ulrich von Sacken, both of Coquitlam, Canada

[73] Assignee: Moli Energy (1990) Limited, Canada

[21] Appl. No.: 756,894

[22] Filed: Dec. 2, 1996

[30]  Foreign Application Priority Data

Dec. 4, 1995 [CA] Canada ..................... 2164385

[51] Int. Cl.⁶ ............................... H01M 006/14
[52] U.S. Cl. ............................. 429/196; 429/197
[58] Field of Search ........................ 429/194, 196, 429/197, 199, 49

[56]  References Cited

U.S. PATENT DOCUMENTS 4,675,260  6/1987  Sakurai et al. .............. 429/196 X
5,474,858  12/1995 Merritt .

FOREIGN PATENT DOCUMENTS 2150877  6/1995  Canada .
571858   12/1993 European Pat. Off. .
9216026  9/1992  WIPO .

OTHER PUBLICATIONS

Sakurai, et al., Correlation Between Microstructure and Electrochemical Behavior of Amorphous $V_2O_5$–$P_2O_5$ in Lithium Cells, J. Electrochem. Soc., vol. 135, No. 4, Apr. 1988, p. 791.

Jones, S.D., Development of a thin–film solid–state microbattery, Proc. Electrochem. Soc., 91–12 (Proc. Int. Symp. Ionic Mixed Conduct. Ceram.), 145–54 (1991) No Month (oxide sulfide glass ele).

Chowdari, B.V.R., et al., Thin Film Studies on $Li_2O$–$P_2O_5$ Based Fast Ion Conducting Glasses, Solid State Ionics 40–51, p. 680–3 (1990) No Month.

*Primary Examiner*—Anthony Skapars
*Attorney, Agent, or Firm*—Lerner, David, Littenberg, Krumholz & Mentlik

[57]  ABSTRACT

The viscosity of certain non-aqueous electrolytes comprising a first lithium salt which can gel on the addition of $P_2O_5$ can be reduced substantially by incorporating therein a small amount of a suitable viscosity reducing salt. In particular, the viscosity of a $LiPF_6$ salt based electrolyte can be reduced by orders of magnitude by incorporating a small amount of $LiBF_4$ therein. Such electrolytes are suitable for use in lithium ion batteries.

24 Claims, 3 Drawing Sheets

LOW VISCOSITY ELECTROLYTE COMPRISING P$_2$O$_5$ FOR USE IN NON-AQUEOUS RECHARGEABLE LITHIUM BATTERIES

FIELD OF THE INVENTION

This invention pertains to electrolytes for non-aqueous rechargeable lithium batteries and to methods for reducing the viscosity thereof. Specifically, it pertains to the use of lithium salt additives as means for reducing the viscosity of electrolytes comprising P$_2$O$_5$.

BACKGROUND OF THE INVENTION

A new type of rechargeable lithium battery known as lithium-ion or 'rocking chair' has recently become available commercially and represents a preferred rechargeable power source for many consumer electronics applications. These batteries have the greatest energy density (Wh/L) of presently available conventional rechargeable systems (ie. NiCd, NiMH, or lead acid batteries). Additionally, lithium ion batteries operate around 3½ volts which is often sufficiently high such that a single cell can suffice for many electronics applications.

Lithium ion batteries use two different insertion compounds for the active cathode and anode materials. Insertion compounds are those that act as a host solid for the reversible insertion of guest atoms (in this case, lithium atoms). The excellent reversibility of this insertion makes such compounds function extremely well in rechargeable battery applications wherein thousands of battery cycles can be obtained. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with the associated electrons travelling in the circuit external to the battery. Although the insertion process is very reversible, a gradual loss of lithium and/or buildup of impedance still can occur upon extended cycling for various reasons. This in turn typically results in a gradual loss in delivered capacity with cycle number.

3.6 V lithium ion batteries based on LiCoO$_2$/pregraphitic carbon electrochemistry are now commercially available (eg. products of Sony Energy Tec. or A&T Battery). Many other lithium transition metal oxide compounds are suitable for use as the cathode material, including LiNiO$_2$ (described in U.S. Pat. No. 4,302,518) and LiMn$_2$O$_4$ (described in U.S. Pat. No. 4,507,371). Also, a wide range of carbonaceous compounds is suitable for use as the anode material, including coke (described in U.S. Pat. No. 4,702,977) and pure graphite (described in U.S. Pat. No. 4,423,125). The aforementioned products employ non-aqueous electrolytes comprising LiBF$_4$ or LiPF$_6$ salts and solvent mixtures of ethylene carbonate, propylene carbonate, diethyl carbonate, and the like. Again, numerous options for the choice of salts and/or solvents in such batteries are known to exist in the art.

P$_2$O$_5$ is a common chemical and its properties are well known. It is known to decompose into various hydrogen-phosphorous-oxygen containing compounds in the presence of water. P$_2$O$_5$ has been used extensively in the art as a reactant for preparing components in lithium batteries. For instance, the prior art contains numerous references to the use of P$_2$O$_5$ as a crystallization modifier in the preparation of vanadium oxide cathode compounds for lithium metal anode batteries (see for example Journal of the Electrochemical Society, Vol. 135, No. 4, April 1988, p.791, Y. Sakurai et al.). In said preparation, the P$_2$O$_5$ is a precursor and exists as alpha or beta VPO$_3$ in the product cathode.

The prior art also contains references wherein P$_2$O$_5$ is used in the preparation of other cathode compounds, but again the P$_2$O$_5$ is substantially changed chemically during the preparation. For example, Mitsubishi Cable Industries in European patent application 571,858 describe the preparation of lithium-cobalt-phosphate cathode compounds and Sanyo in Japanese patent application laid-open no. 01-067869 describe the preparation of treated manganese oxide cathode compounds.

Additionally, the prior art contains references to the use of P$_2$O$_5$ as a reactant in the preparation of anode compounds for lithium ion batteries. For instance, Sony in PCT Application WO 9216026 describe the preparation of phosphorous-carbon anode compounds. Again, the reactant P$_2$O$_5$ is substantially modified chemically by the preparation.

Also, P$_2$O$_5$ has been used in the art as a precursor for the preparation of certain glassy solid electrolytes (as in the preparation of an oxide/sulfide glass described in Proc. Electrochem. Soc., 91-12 (Proc. Int. Symp. Ionic Mixed Conduct. Ceram.), 145–54 (1991) by S. Jones et al. or the preparation of an oxide glass mix described in Solid State Ionics, 40–41, p680–3 (1990) by B. Chowdari et al.).

Thus, although P$_2$O$_5$ has been used extensively as a reactant for components employed in non-aqueous lithium batteries, until recently P$_2$O$_5$ itself seems not to have been identified as a useful battery component or additive.

In Canadian Patent Application Serial No. 2,150,877, by the same inventors, filed Jun. 2, 1995, it is demonstrated that exposing the electrolyte of certain non-aqueous rechargeable lithium batteries to P$_2$O$_5$ can result in improved battery fade rate characteristics. (Fade rate was defined therein as the fractional loss of capacity per cycle.) This can be accomplished by incorporating the P$_2$O$_5$ into either electrode. However, a simple means for exposure is to directly add P$_2$O$_5$ particles to the electrolyte itself. The P$_2$O$_5$ can be partly in solution or simply suspended in the electrolyte.

Incorporating P$_2$O$_5$ in lithium batteries can improve the cycling performance of lithium batteries. A preferred method of incorporating for purposes of mass production is to partially dissolve and/or suspend P$_2$O$_5$ powder in a liquid electrolyte. However, with certain desired electrolyte formulations, such incorporation can result in a substantial undesirable increase in viscosity of the electrolyte. The viscosity can become increasingly non-newtonian and exhibit the characteristics of a pseudoplastic. (The term pseudoplastic describes behaviour wherein the viscosity increases with decreasing shear rate. Such behaviour is common for suspensions or slurries generally.) Unfortunately, a substantial increase in viscosity, particularly at low shear rates, poses a problem when such electrolytes are used in the manufacture of lithium batteries.

Typically, during lithium battery manufacture, electrolyte is introduced after the dry assembly of the internal components (including electrodes, separators, current collectors, etc.) Although the dry assembly components may actually be fairly porous, it is nonetheless difficult to get common non-aqueous electrolytes to permeate the microporous network of the dry assembly. In order to accelerate the electrolyte filling operation, it is common to use pressure differentials created by vacuum and/or ambient pressure exposures to assist the filling. Higher viscosity electrolytes slow down the filling process even more, or conversely require even greater pressure differentials. Neither situation is desirable.

SUMMARY OF THE INVENTION

In the absence of interactions between the components, normally the inclusion of additional dissolved species in a solution will result in an increase in viscosity of the solution. However, we have unexpectedly found that the viscosity increase associated with the incorporation of $P_2O_5$ in the electrolyte can be avoided for the most part by including a small amount of a viscosity reducing salt in the electrolyte as well. With such reduction in viscosity, conventional filling processes might thus still be used. Also, since only a small amount of the viscosity reducing salt need be used, the other characteristics of the bulk electrolyte may not be significantly affected.

The instant invention includes methods of reducing the viscosity of non-aqueous electrolytes comprising $P_2O_5$ and novel rechargeable lithium batteries employing such electrolytes. The non-aqueous rechargeable lithium batteries of the invention generally comprise a lithium insertion compound cathode (in particular $LiCoO_2$), a lithium compound anode (in particular a carbonaceous insertion compound), and a non-aqueous electrolyte comprising a first lithium salt dissolved in a non-aqueous solvent and $P_2O_5$. The non-aqueous electrolyte also comprises a viscosity reducing salt dissolved in the non-aqueous solvent wherein the viscosity of the electrolyte is less than that of a comparable electrolyte identical in composition to the non-aqueous electrolyte but absent the viscosity reducing salt. The viscosity reducing salt can be a second lithium salt.

The viscosity reduction can be such that the viscosity of the electrolyte is less than about 10 times that of the comparable electrolyte. The comparable electrolyte can be pseudoplastic, having a viscosity greater than about 100 centipoise at shear rates close to zero. It can be difficult to use conventional battery filling processes when the electrolyte has such high viscosity. Conversely, if the viscosity is reduced such that it is less than about 100 centipoise at shear rates close to zero, conventional filling processes can be more easily used.

In particular, electrolytes with $LiPF_6$ as a first lithium salt can have viscosities that increase with the incorporation of $P_2O_5$. An amount of about 1 mole of $LiPF_6$ in a liter of electrolyte solution can result in such an increase.

A suitable viscosity reducing second lithium salt is $LiBF_4$. A substantial viscosity reduction can be achieved for electrolyte comprising greater than about 0.1 moles of $LiBF_4$ in a liter of solution. The advantages of the invention can be achieved for certain electrolytes using from about 0.1 to about 0.3 moles of $LiBF_4$ in a liter of electrolyte solution.

The incorporation of greater than about 0.1 moles of $P_2O_5$ added per liter of electrolyte solution can result in a substantial viscosity increase in a conventional electrolyte. The invention is thus particularly suited for use with such electrolytes since a substantial viscosity decrease is inherently possible.

The non-aqueous solvent of the battery can comprise an organic carbonate and can be a mixture of ethylene carbonate, propylene carbonate, and diethyl carbonate.

In general, the method of the invention involves reducing the viscosity of a non-aqueous electrolyte comprising a first lithium salt dissolved in a non-aqueous solvent and $P_2O_5$, by dissolving a second lithium salt in the non-aqueous solvent. The sequence of steps may be varied, but the $P_2O_5$ is preferably not added to a solution comprising the viscosity increasing, first lithium salt alone.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
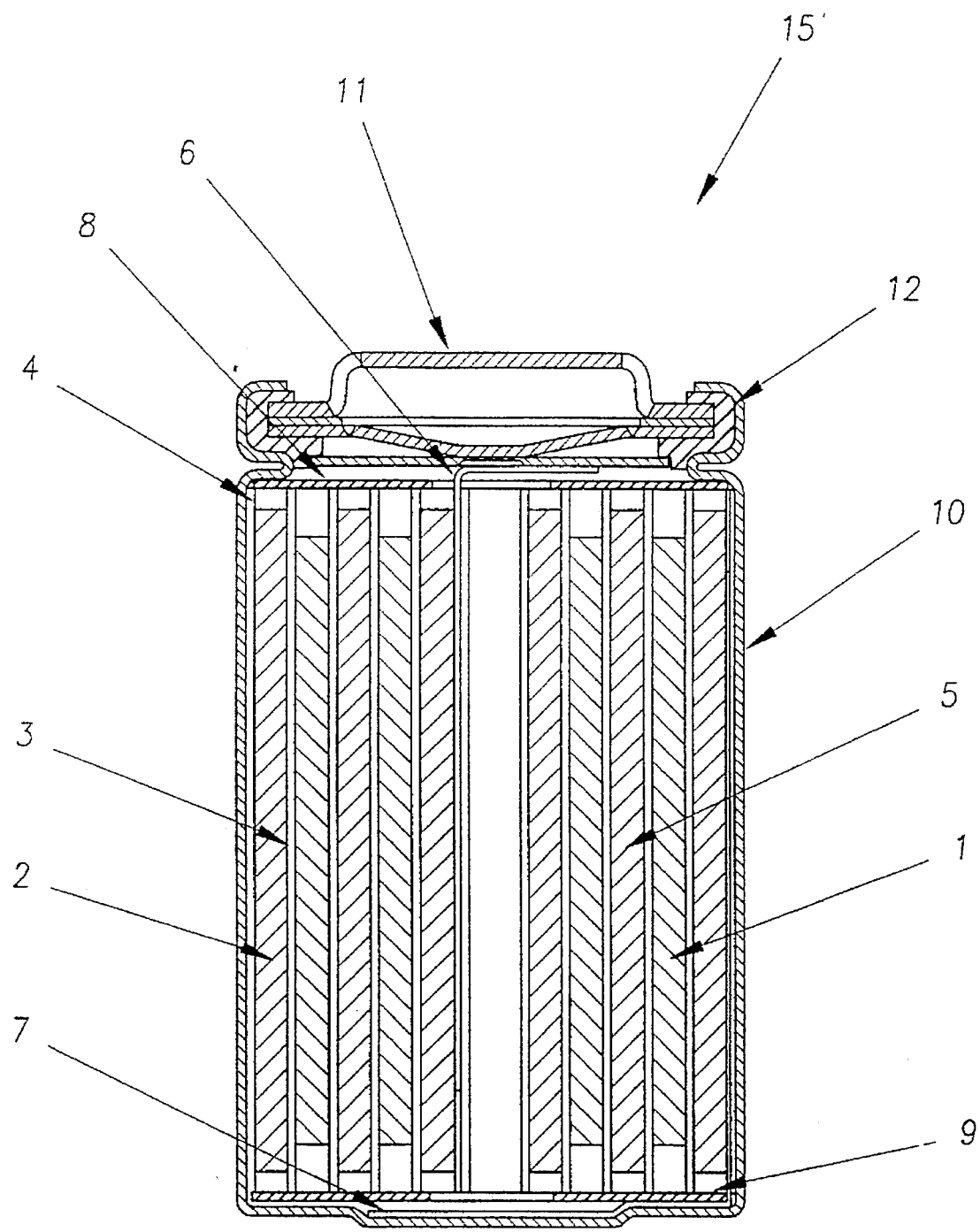
FIG. 1 depicts a cross-sectional view of a preferred embodiment of a cylindrical spiral-wound lithium ion battery.

The fade rate characteristic of non-aqueous lithium rechargeable batteries in general can be improved by incorporating $P_2O_5$ in the electrolyte. However, the viscosity of such electrolytes can detrimentally change significantly as a result. The viscosity can become increasingly that of a pseudoplastic and can show a substantial increase in viscosity with increasing $P_2O_5$ content. This viscosity increase, particularly at low shear rates, can make the electrolyte filling process very difficult during the manufacture of lithium batteries. This viscosity increase can be mostly counteracted by including a small amount of a viscosity reducing salt in the electrolyte.

A method for preparing reduced viscosity electrolytes of the invention involves starting with a non-aqueous solvent mixture in an amount suitable for making the desired molarity solution without the $P_2O_5$ present. The desired small amount of fine $P_2O_5$ powder is then added. A suspension is then created, typically by ultrasonic bath exposure until the powder is completely dispersed. This process can take several hours or more. (If any amounts of powder settle and refuse to be dispersed, the suspension can be decanted leaving behind the settled powder. A compensating amount of $P_2O_5$ powder can then be added and suspended.) Thereafter, the appropriate amounts of both the first and the viscosity reducing salt are added and dissolved thereby forming the electrolyte.

The viscosity reducing salt can in principle be any salt comprising a suitable cation and viscosity reducing anion. Alkali metal salts other than lithium salts (eg. $NaBF_4$) or other cation salts (eg. quaternary ammonium salts) may be suitable viscosity reducing salts if the presence of cations other than lithium is desired for certain other reasons. However, alkali metals other than lithium may also insert in certain battery electrodes and this may be undesirable. Also, unless specifically desired, the presence of other cation salts may only serve to complicate the electrochemistry. Generally, therefore, a preferred viscosity reducing salt is a second lithium salt since the action is the same as that of the salt providing the primary function of the electrolyte.

The order of addition of components can in principle be varied. However, it is desirable to avoid the formation of aggregates of $P_2O_5$ powder during the preparation since it is much more difficult to redisperse aggregates once they are formed. Thus, $P_2O_5$ powder is preferably not added to a solution comprising only the viscosity increasing, first lithium salt alone. However, it is acceptable to add a viscosity increasing, first lithium salt to a previously well dispersed $P_2O_5$ suspension. Alternately, the second salt can be dissolved initially and then the $P_2O_5$ can be added and suspended, and so on.

Lithium ion batteries employ a lithium insertion compound as the cathode and one of a variety of lithium compounds as the anode. Possible lithium compounds include lithium metal, lithium alloys, and lithium insertion compounds. Preferred embodiments are lithium ion batteries wherein the anode is also a lithium insertion compound.

A preferred electrolyte for such batteries comprises $LiPF_6$ salt dissolved in a mixture of ethylene carbonate (EC), ethyl methyl carbonate (EMC),and diethyl carbonate (DEC) solvents. This choice of salts can result in a safer, more stable electrolyte than would other salt choices. However, if $P_2O_5$ powder is added to this electrolyte for purposes of improving the cycling behaviour of the battery, the viscosity of the electrolyte increases substantially to form a thick gel. This electrolyte cannot be successfully used with conventional battery filling techniques that can only handle the electrolyte at low shear rates. However, as shown in the following Examples, adding a small amount of $LiBF_4$ largely counteracts the viscosity increase due to the $P_2O_5$. Since only a small amount of $LiBF_4$ is added, the other bulk characteristics of the electrolyte are largely unaffected.

Various configurations are possible for the batteries of the invention (ie. prismatic formats or miniature coin cells). A preferred construction for a lithium ion type product is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, usually a lithiated transition metal oxide such as $LiCoO_2$, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include safety devices if desired. A combination safety vent and pressure operated disconnect device may be employed. FIG. 1 shows one such combination that is described in detail in Canadian Patent Application No. 2,099,657. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, the electrolyte of the invention 5 is added to fill the porous spaces in the jelly roll 4.

In order to accelerate the electrolyte filling operation, it is common to use pressure differentials created by vacuum and/or ambient pressure exposures to assist the filling. In this method, the dry battery assembly is first evacuated and then a portion of the required amount of electrolyte 5 is added above the jelly roll 4 thereby forming a head of electrolyte. (Usually, only a portion of the total required amount of electrolyte can fit in the head space above the jelly roll 4.) The vacuum is then broken, exposing the battery assembly to ambient pressure and driving the head of electrolyte into the porous spaces in the jelly roll 4. The process is then repeated as many times as necessary until the required total amount of electrolyte 5 fills the battery.

The header 11 is then crimped to the can 10. Lastly, an electrical conditioning step involving at least a single charging of the battery is usually performed as part of the assembly process.

The following Examples are provided to illustrate certain aspects of the invention but should not be construed as limiting in any way. 18650 size cylindrical batteries (18 mm diameter, 650 mm height) were fabricated as described in the preceding and shown generally in FIG. 1. Cathodes 1 comprised a mixture of $LiCoO_2$ powder, graphite conductive dilutant, and polyvinylidene fluoride (PVDF) binder in a weight ratio of 91%, 6%, and 3% respectively that was uniformly coated on both sides of a thin aluminum foil about 5.8 cm by 55 cm in dimension. Coating weight and density was about 44 $mg/cm^2$ and 3.5 g/cc respectively. Anodes 2 were made using a mixture of a spherical graphitic powder plus Super S (trademark of Ensagri) carbon black and PVDF binder in a weight ratio of about 88%, 2%, and 10% respectively that was uniformly coated on thin copper foil with dimensions to match the cathode. Coating weight and density was about 19 $mg/cm^2$ and 1.4 g/cc respectively. Celgard® 2400 microporous polypropylene film was used for the separators 3.

The electrolytes 5 used were solutions of 1M $LiPF_6$ salt dissolved in a solvent mixture of ethylene carbonate (EC), ethyl methyl carbonate (EMC),and diethyl carbonate (DEC) in a volume ratio of 20/50/30 respectively plus varied amounts of $P_2O_5$ and/or $LiBF_4$ as indicated. At first, the solvents alone were mixed in the amounts required to make an electrolyte identical in composition to that desired except without the $P_2O_5$ present. Next, the desired amount of $P_2O_5$ powder was added to the solvent mixture, followed by 2 to 3 hours of mixing using an ultrasonic bath in order to make a $P_2O_5$ powder suspension wherein no white $P_2O_5$ powder could be seen in the solution. Finally, the appropriate amount of $LiPF_6$ salt and, where indicated, $LiBF_4$ salt was added. Viscosity measurements as a function of shear rate at 25° C. were made in a dry room using a Brookfield viscometer equipped with a #18 cylindrical spindle. Approximately 4 cc of electrolyte was used in each battery. Unless otherwise indicated, batteries were filled with electrolyte as described above in discrete steps using a sequence of vacuum/ambient pressure exposures to assist filling.

For electrical testing, batteries were thermostatted at 21°±1° C. Cycling was performed using a current limited, constant voltage charge (1A maximum, 4.1 volts) for 2.5 hours and a constant 1.2 amp current discharge to a 2.5 volt cutoff.

COMPARATIVE EXAMPLE

Figure 2A:
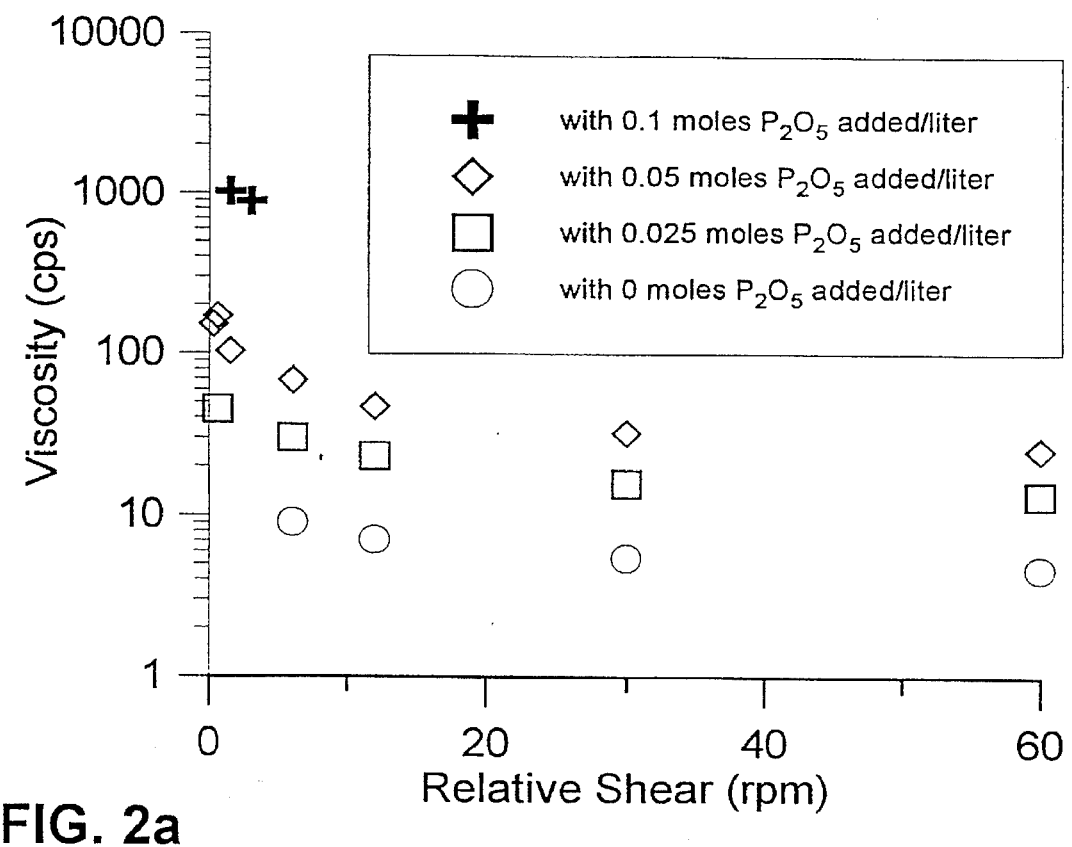
FIG. 2a shows the viscosity versus shear rate data for the electrolytes of the Comparative Example comprising different amounts of $P_2O_5$.

A series of electrolytes was prepared as described in the preceding with varying levels of $P_2O_5$ added thereto (0, 0.025, 0.05, or 0.1 moles added per liter of solution). Viscosities for this series were determined versus shear rate as described above and are shown in FIG. 2a. The viscosity generally increases at all shear rates with increasing amounts of $P_2O_5$. However, the viscosity at low shear rates (ie. close to zero) increases proportionally more in accordance with the character of the electrolytes becoming more pseudoplastic with increasing amounts of $P_2O_5$. There is more than a factor of 100 increase between electrolytes comprising 0 and 0.1 moles added $P_2O_5$ at low shear rates. The latter electrolyte has the appearance of a thick gel.

Figure 2B:
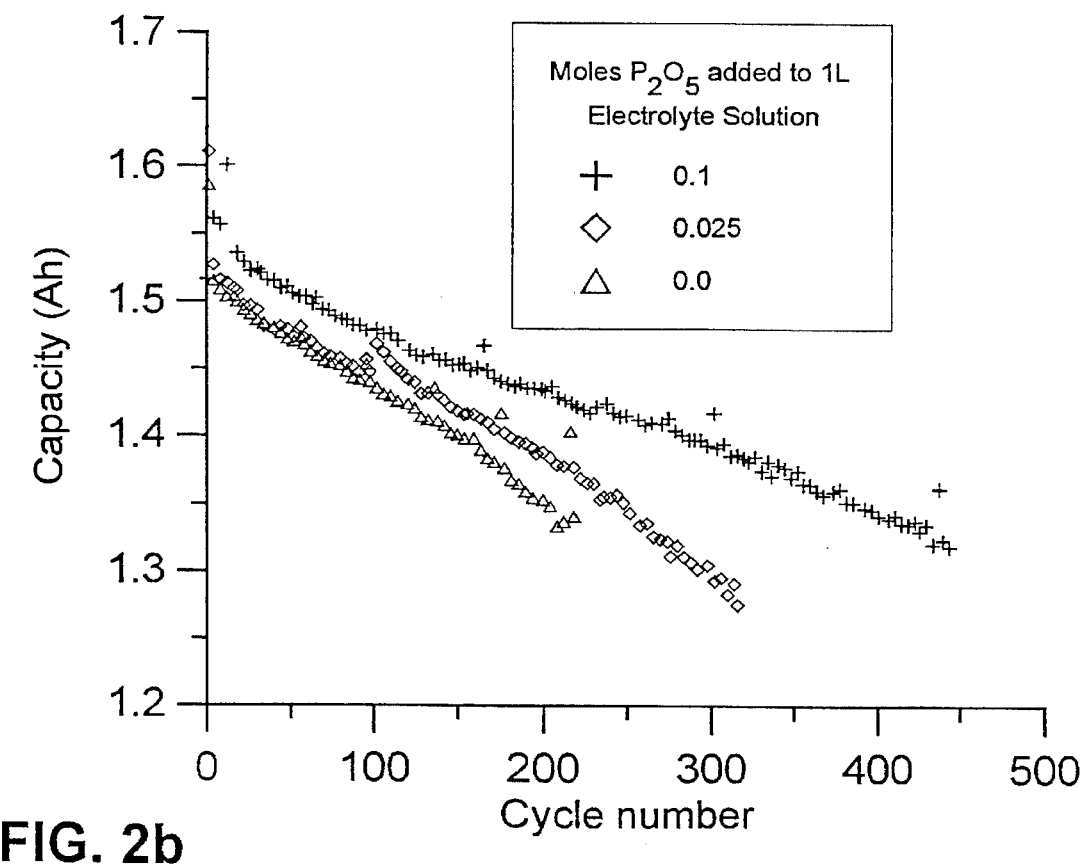
FIG. 2b shows the capacity versus cycle number data for the cycle tested batteries of the Comparative Example.

18650 batteries were constructed using electrolytes comprising either 0, 0.025, or 0.1 moles of $P_2O_5$ added per liter of solution. In order to fill the battery with the last of these electrolytes, the battery was inverted in a bath of electrolyte and 200 psi pressure was used to assist filling rather than ambient pressure. Thus, an excess of electrolyte was injected under high pressure. Excess electrolyte was removed afterwards with a syringe. Prior to sealing, the wetted areas on the header and can had to be cleaned and dried. Batteries were then cycled as described above. FIG. 2b shows the capacity versus cycle number data for the batteries. (Note: the discontinuities in the capacity versus cycle number data every 100 cycles are the result of temporarily stopping the cycle testing and letting the batteries sit idle.)

The battery comprising 0.1 moles of $P_2O_5$ added per liter of solution shows an improved fade rate over the other batteries. However, the battery comprising 0.025 moles of $P_2O_5$ added per liter of solution does not show an improvement. Thus, while this latter electrolyte has a low enough viscosity (only about a factor of 2 or 3 increase as a result of $P_2O_5$ addition) such that battery filling can be accomplished in a conventional manner, unfortunately it does not have enough $P_2O_5$ to obtain a performance improvement.

INVENTIVE EXAMPLE

Figure 3A:
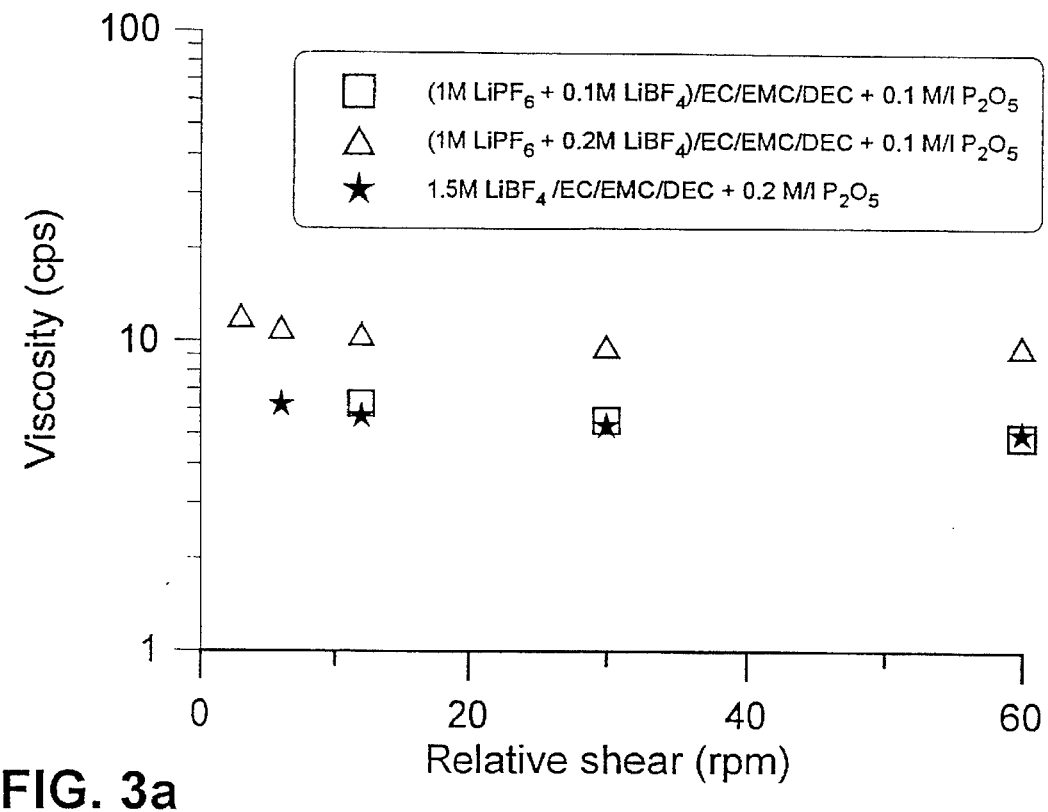
FIG. 3a shows the viscosity versus shear rate data for the various electrolytes of the Inventive Example.

A series of electrolytes were prepared with 0.1 moles of $P_2O_5$ added per liter of solution as described above except that an amount of $LiBF_4$ was added as well such that the electrolytes were either 0.1, 0.2, or 0.3M solutions of $LiBF_4$. Viscosities were determined versus shear rate for two of these electrolytes and are shown in FIG. 3a. Also shown for purposes of comparison is viscosity data for a $LiBF_4$ based electrolyte having no $LiPF_6$ salt at all. The viscosities of all these electrolytes were fairly similar and were roughly constant as a function of shear rate over the range tested (ie. no evidence of pseudoplastic character). Most importantly, the viscosities of all these electrolytes were reduced substantially and were roughly similar to that of a comparable electrolyte having no $P_2O_5$ nor $LiBF_4$ added (ie. as in the Comparative Example). The electrolytes did not have the appearance of a gel.

Figure 3B:
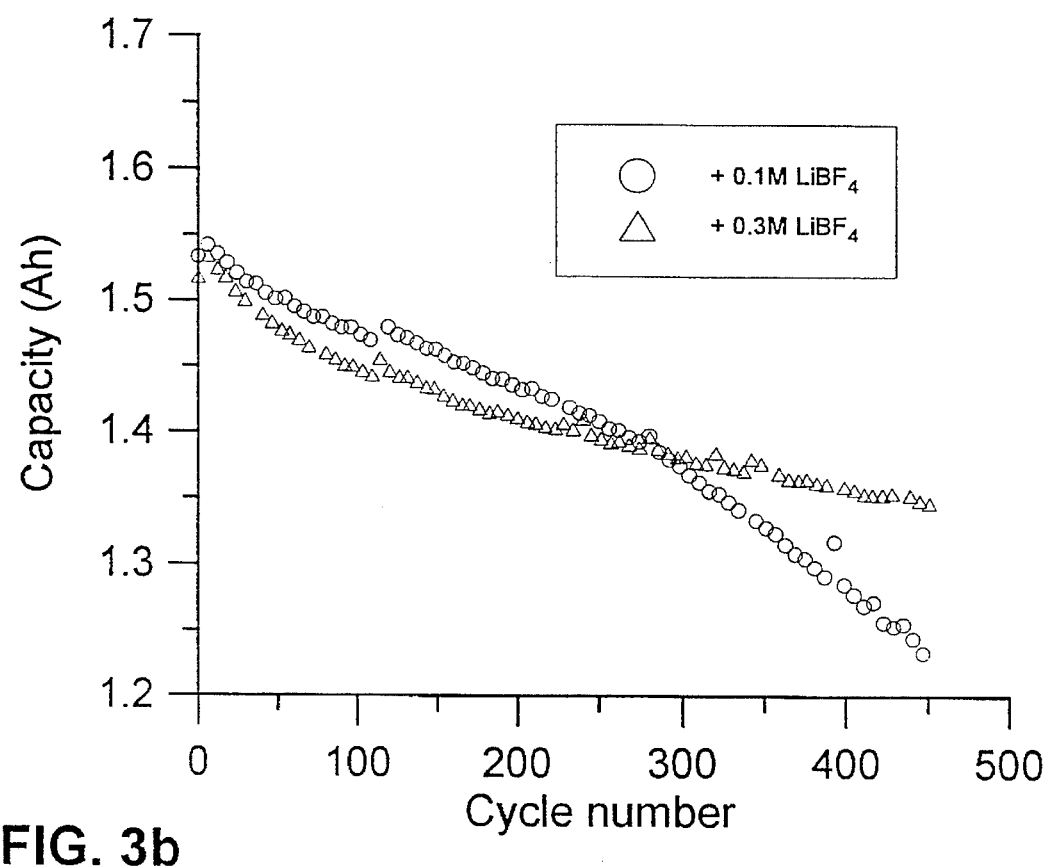
FIG. 3b shows the capacity versus cycle number data for the cycle tested batteries of the Inventive Example.

18650 batteries were constructed using electrolytes comprising the 0.1 and 0.3M solutions of $LiBF_4$ and were cycled as above. FIG. 3b shows the capacity versus cycle number data for these batteries. An improved fade rate is seen in each case over that of a battery having no $P_2O_5$ additive (see the Comparative Example). Thus, a substantial viscosity reduction can be achieved by incorporating a small amount of $LiBF_4$ salt in the preferred electrolyte (as little as 0.1M) for one particular lithium ion battery electrochemistry, without adversely affecting the fade rate characteristics thereof.

As will be apparent to those skilled in the art in the light of the foregoing disclosure, many alterations and modifications are possible in the practice of this invention without departing from the spirit or scope thereof. For example, $LiBF_4$ or chemically similar additives can be expected to reduce the viscosity of other electrolytes that gel as a result of the presence of $P_2O_5$. Additionally, the viscosity of polymer electrolytes that incorporate $P_2O_5$ might be desirably reduced to a level similar to that of a comparable polymer electrolyte without $P_2O_5$ incorporated (the viscosity of the latter still being relatively very high to that of typical liquid electrolytes). Accordingly, the scope of the invention is to be construed in accordance with the substance defined by the following claims.

What is claimed is:

1. A non-aqueous rechargeable lithium battery comprising:

a lithium insertion compound cathode;

a lithium compound anode; and a non-aqueous electrolyte comprising a first lithium salt, a viscosity reducing salt, and $P_2O_5$, the first salt and the viscosity reducing salt being dissolved in a non-aqueous solvent.

2. A battery as claimed in claim 1 wherein the viscosity of the electrolyte is less than about 100 centipoise at shear rates close to zero.

3. A battery as claimed in claim 1 wherein the first lithium salt is $LiPF_6$.

4. A battery as claimed in claim 3 wherein the electrolyte comprises about 1 mole of $LiPF_6$ in a liter of solution.

5. A battery as claimed in claim 1 wherein the viscosity reducing salt is a second lithium salt.

6. A battery as claimed in claim 5 wherein the second lithium salt is $LiBF_4$.

7. A battery as claimed in claim 6 wherein the electrolyte comprises greater than about 0.1 moles of $LiBF_4$ in a liter of solution.

8. A battery as claimed in claim 1 wherein the electrolyte comprises greater than about 0.1 moles of $P_2O_5$ added per liter of solution.

9. A battery as claimed in claim 1 wherein the non-aqueous solvent comprises an organic carbonate.

10. A battery as claimed in claim 9 wherein the non-aqueous solvent is a mixture of ethylene carbonate, propylene carbonate, and diethyl carbonate.

11. A battery as claimed in claim 1 wherein the first lithium salt is $LiPF_6$, the viscosity reducing salt is $LiBF_4$, the non-aqueous solvent comprises an organic carbonate, and the electrolyte comprises about 1 mole of $LiPF_6$ in a liter of solution, from about 0.1 to about 0.3 moles of $LiBF_4$ in a liter of solution, and greater than about 0.1 moles of $P_2O_5$ added per liter of solution.

12. A battery as claimed in claim 1 wherein the cathode comprises $LiCoO_2$.

13. A battery as claimed in claim 1 wherein the anode comprises a carbonaceous insertion compound.

14. A method for reducing the viscosity of a non-aqueous electrolyte comprising dissolving a first lithium salt and a viscosity reducing salt in a non-aqueous solvent together with $P_2O_5$.

15. A method as claimed in claim 14 wherein the viscosity of the electrolyte is reduced by more than about 10 times.

16. A method as claimed in claim 14 wherein the electrolyte is initially pseudoplastic and has a viscosity greater than about 100 centipoise at shear rates close to zero.

17. A method as claimed in claim 14 wherein the viscosity of the electrolyte is reduced to be less than about 100 centipoise at shear rates close to zero.

18. A method as claimed in claim 14 wherein the first lithium salt is $LiPF_6$.

19. A method as claimed in claim 18 wherein the electrolyte comprises about 1 mole of $LiPF_6$ in a liter of solution.

20. A method as claimed in claim 14 wherein the viscosity reducing salt is $LiBF_4$.

21. A method as claimed in claim 20 wherein greater than about 0.1 moles of $LiBF_4$ is dissolved in a liter of solution.

22. A method as claimed in claim 14 wherein the electrolyte comprises greater than about 0.1 moles of $P_2O_5$ added per liter of solution.

23. A method as claimed in claim 14 wherein the non-aqueous solvent comprises an organic carbonate.

24. A method as claimed in claim 23 wherein the non-aqueous solvent is a mixture of ethylene carbonate, propylene carbonate, and diethyl carbonate.

* * * * *